UNITED STATES PATENT OFFICE.

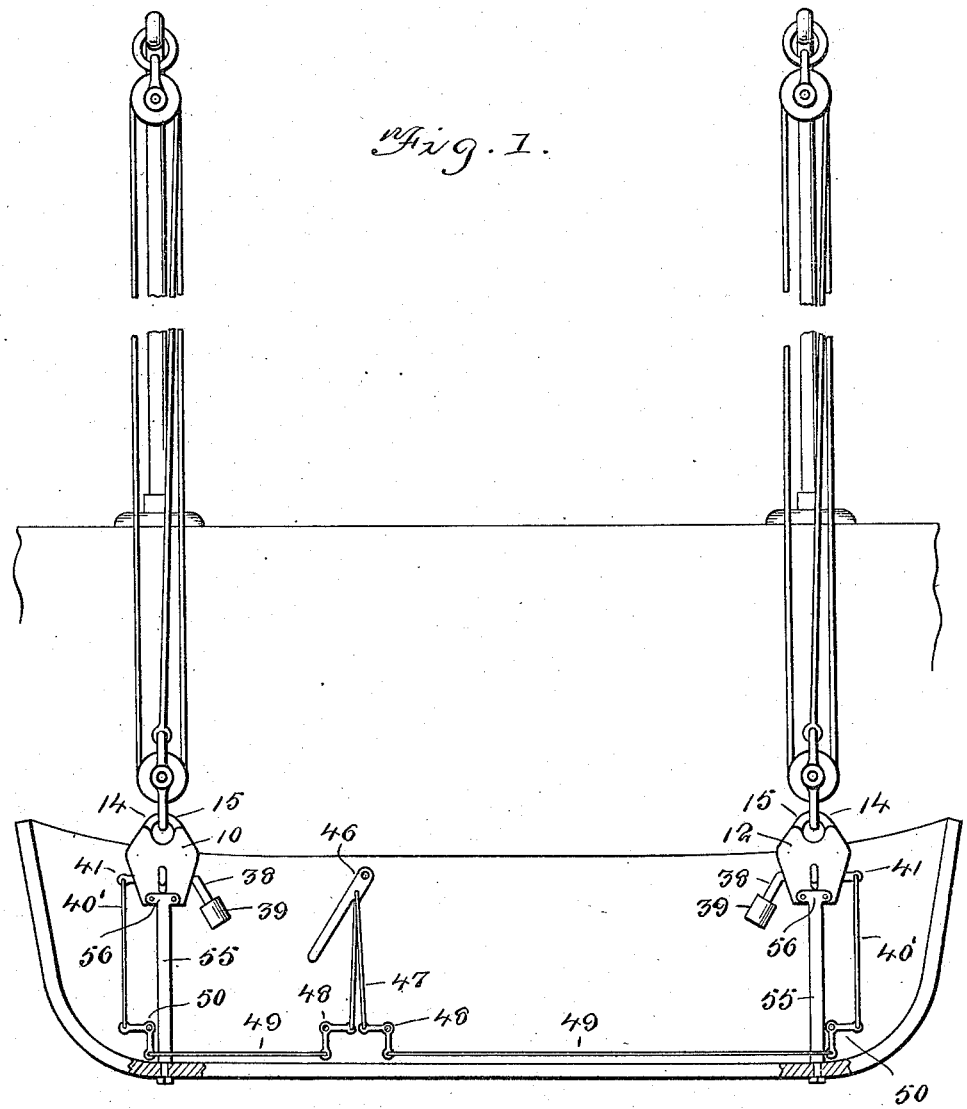

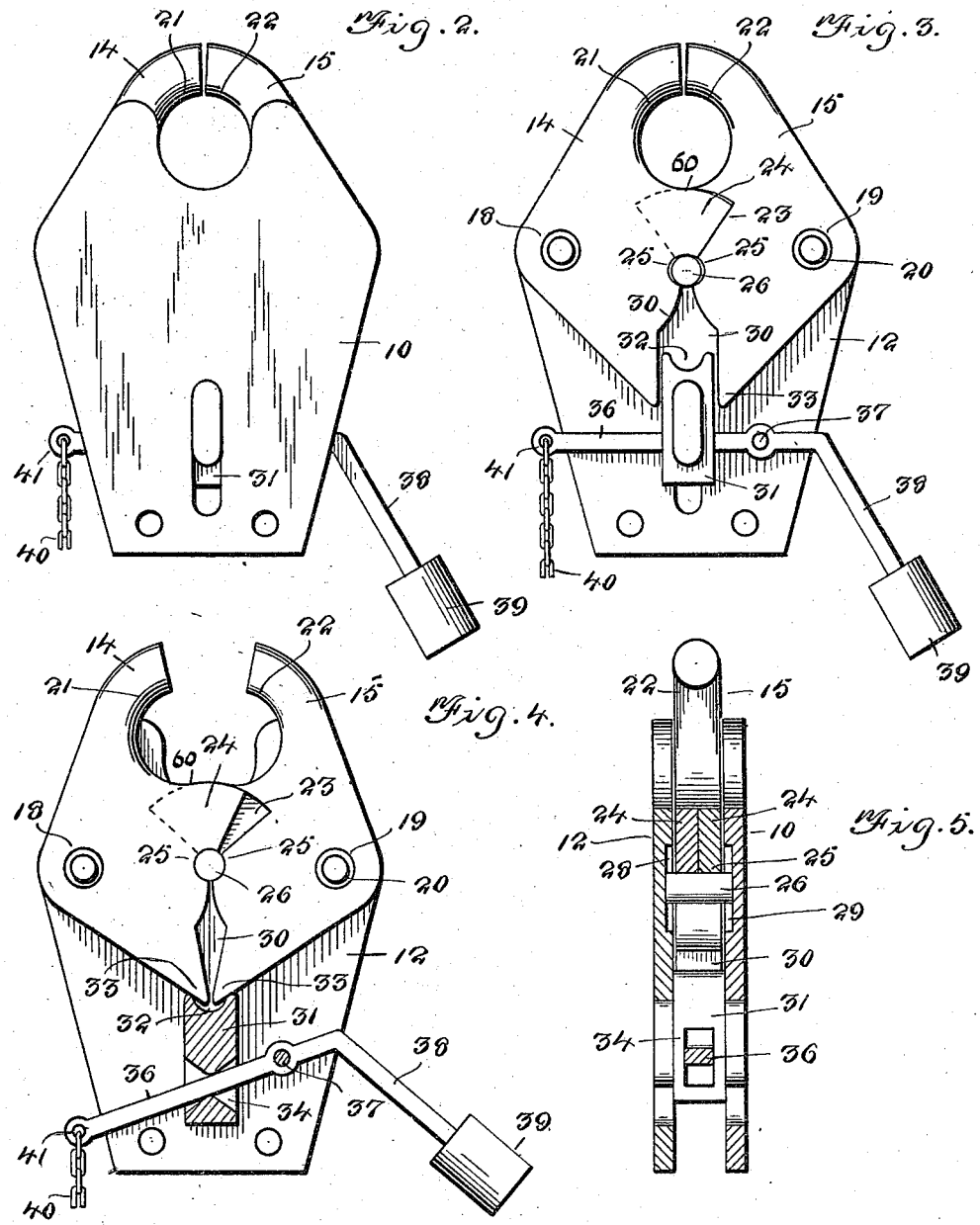

CHARLES S. LENZ, OF NEW YORK, N. Y., ASSIGNOR TO COSTON SIGNAL, OF NEW YORK, N. Y., A CORPORATION OF NEW YORK.

RELEASING-GEAR FOR LIFE-BOATS.

1,280,497.

Specification of Letters Patent.

Patented Oct. 1, 1918.

Application filed March 2, 1918. Serial No. 220,048.

*To all whom it may concern:*

Be it known that I, CHARLES S. LENZ, a citizen of the United States, residing at New York city, in the county of New York and State of New York, have invented new and useful Improvements in Releasing-Gears for Life-Boats, of which the following is a specification.

This invention relates to a releasing gear for life boats, and the object is to provide a releasing member for use in connection with the tackle at the bow and stern, with means for effecting the release of each member independently, and means for disengaging the releasing members simultaneously.

With the foregoing and other objects in view the invention consists in providing a plurality of pivotally mounted members or jaws, with means for locking the latter, said locking means including a counter-balanced arm adapted to be manually operated for disengaging the pivoted jaws, means for operating a plurality of such arms at one time by a single lever, and suitable connections between the latter and the aforesaid arms.

In the accompanying drawings:

Figure 1 is a view in elevation showing the releasing gear in operative position, and a boat being lowered at the side of a vessel, Fig. 2 is an elevation of the releasing device, Fig. 3 is an elevation with one of the cover members removed, Fig. 4 shows the structure of Fig. 3, the jaws being in a release position.

Fig. 5 is a vertical section.

In carrying out my invention I provide a casing including a plurality of plate members 10 and 12 spaced apart and connected in any suitable manner. Between these plate members 10 and 12 are mounted pivoted jaws 14 and 15. Each jaw is pivoted by means of a pin 18 or 19, as the case may be. Each pin is shouldered as shown at 20 the shouldered portions engaging the inner surfaces of the plate members.

The jaws proper are cut away as shown at 21 and 22, and these elements together form a substantially circular aperture when the jaws are closed. Each of the jaws is provided with a recess 23 and with an extension 24, this extension on each jaw coöperating with the recess of the adjacent jaw. Each jaw is also cut away as shown at 25 the oppositely located portions 25 forming a circular aperture accommodating a pin 26. The ends of this pin are movable lengthwise of the plate members 10 and 12 in view of the recesses 28 and 29 provided in the plate members. Pin 26 aids in maintaining the jaws in position so that their ends rest in notch 32, when the device is released.

The inner ends of the pivoted jaws are cutaway as shown at 30 for the accommodation of a locking member 31, which may have substantially the form shown in the drawings, and which may be provided with a cutaway portion 32 at one end adapted to engage the extreme ends 33 of the jaws when the latter are in open position, and to retain them in that position temporarily in view of the somewhat free contact provided. The locking member is provided with an opening 34 extending transversely therethrough for the accommodation of a locking arm 36. This arm is pivoted at 37 and is deflected downwardly as shown at 38, carrying at its lower end a weight or counter-balance 39, normally holding the locking member 31 in a position for spreading apart the portions 30 of the jaws and retaining the portions 21 and 22 in positive engagement.

Any suitable releasing means such as a chain or cable 40 is connected with arm 36 at the point 41. The extensions 24 coöperating with the recesses 23 also act as guiding devices. Those portions of the pivoted jaws which approach each other at a point directly between pins 18 and 19 bear against the central pin 26 which is guided with reference to the plate members in the manner above described.

Upon the operation of the arm 36 by means of chain or cable 40, and the withdrawal of the locking member 31, the operative ends of the jaws are separated, or are allowed to separate when tension is exerted thereon, from the inner side, as by means of a hook or ring member carried at the end of the cable from which the boat being lowered is supported. The walls of opening 34 in member 31 are formed as shown and slight play is provided at this point.

In order to provide for releasing in one operation the boat being lowered, I employ a single operating lever such as 46, the lever having connection by means of rods 47 with angle levers 48, which in turn are connected with rods 49 leading to angle levers 50. These levers last named have connection with rods or cables 40'. It is obvious that all of the connections, just described, may be in the form of cables passing over pulleys, if desired, thereby dispensing with the connecting rods and levers. While this construction permits of the operation of the locking jaws of each releasing member required for lowering the boat, it is obvious that either releasing member may be operated independently by the manual control of either cable or connecting rod 40'.

The releasing member at the bow and at the stern is mounted on a suitable standard 55, being secured by means of bolts passing through a cross piece 56 carried by each standard. These standards pass through the bottom of the boat and are secured to the keel.

When the jaws are in open position and are held by the cutaway portion 32 in the end of locking member 31, this locking member, then acting merely as a temporary holding device, is readily displaced by the engagement of any object with the edge portions 60 of the jaws. Impact or engagement at this point serves to close the jaws and to separate them at their inner ends for the admission of the locking member between the portions designated 30, the weight carried by the arm automatically throwing locking member 31 into operative position.

What is claimed is:

1. In a device of the class described, a plurality of releasing devices each comprising a plurality of pivoted jaws, devices adapted for insertion between the pivoted jaws for locking the latter, a pivoted arm connected with each of the devices last named, means for normally holding the locking devices in operative position and means for releasing said devices.

2. In a device of the class described, a plurality of releasing devices each including a pair of pivoted locking jaws, a locking device adapted for insertion between each pair of pivoted jaws, a counter-balanced arm controlling each locking device, and means for throwing the arm and locking device out of operative position.

3. In a device of the class described, a plurality of releasing devices each including a pair of pivoted locking jaws, said jaws approaching each other at points between the pivots and being cutaway, a pin engaged by the cutaway portion of each jaw, a device adapted for insertion between the inner ends of the jaws for holding the outer ends thereof in locked position, counter-balanced means for retaining the locking devices in operative position, and means for simultaneously throwing the locking element of each releasing device first named out of operative position.

4. In a device of the class described, a casing including a plurality of plate members spaced apart, a plurality of pivoted jaws mounted between said plate members, each jaw including outer complementary engaging devices and inner cutaway portions adapted to receive therebetween a locking element, each jaw being provided with recessed portions oppositely located at points between the pivotal mounting of the respective jaws, an extension carried by each jaw coöperating with the recessed portion of the adjacent jaw, a locking device adapted to be inserted between the cutaway portions of the inner ends of the jaws, counter-balanced means controlling the locking device, and means for manually controlling said locking device.

5. In a device of the class described, a plurality of pivoted jaws, the outer portions of which are cutaway on their approaching edges to form an opening when the jaws are in locked position, the edge portions of the jaws adjacent to the opening overlapping each other and the inner portions of the jaws being cutaway at their edges to form a space therebetween when the outer ends of the jaws are in contact, the pivotal mounting of the jaws permitting the latter to be thrown to closed position when engaged at a point adjacent the overlapping portions.

In testimony whereof I affix my signature.

CHARLES S. LENZ.

Copies of this patent may be obtained for five cents each, by addressing the "Commissioner of Patents, Washington, D. C."